E. H. G. BRINSER.
MILK DISPENSING VESSEL.
APPLICATION FILED FEB. 6, 1909.
960,492.
Patented June 7, 1910.
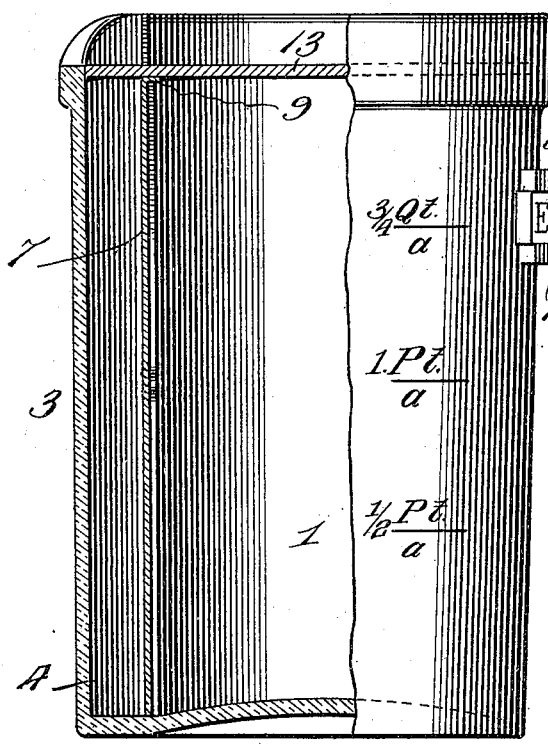
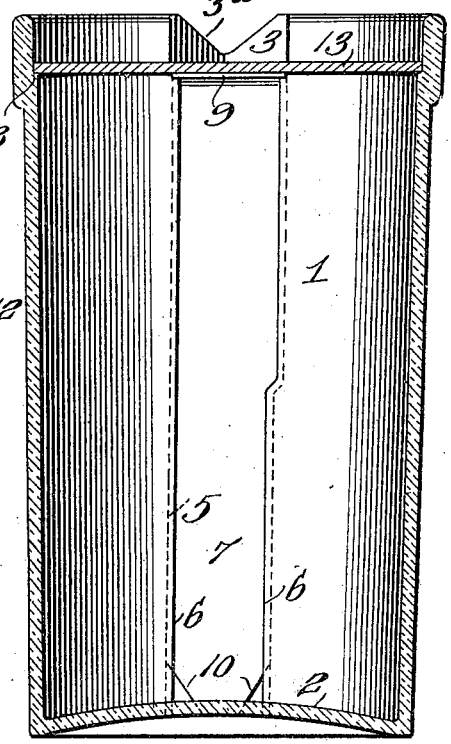
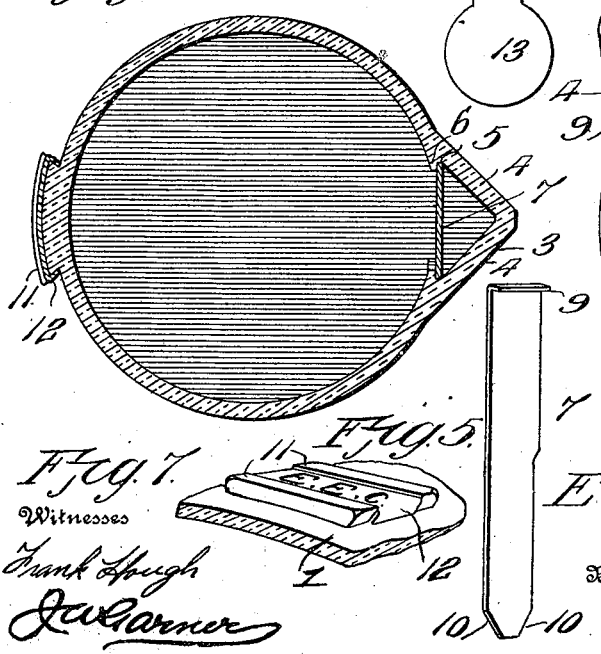
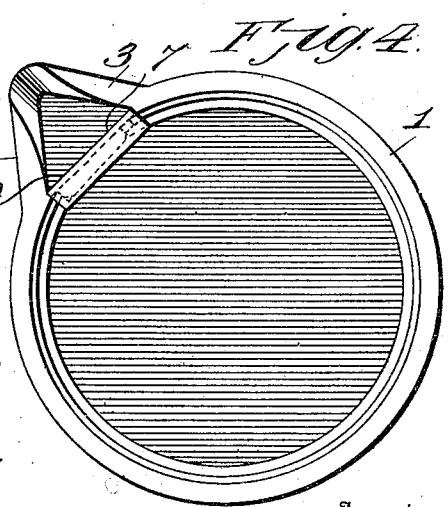
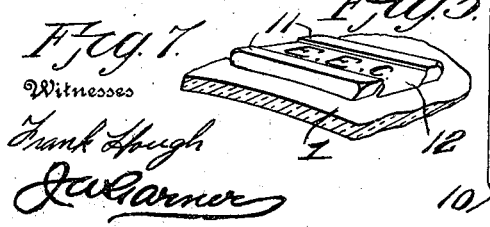
Inventor
Eli H. G. Brinser,
By Victor J. Evans
Attorney
Witnesses
Frank Hugh
J. W. Garner

UNITED STATES PATENT OFFICE.

ELI H. G. BRINSER, OF ELIZABETHTOWN, PENNSYLVANIA, ASSIGNOR OF ONE-TENTH TO CHARLES K. MUSSER, OF ELIZABETHTOWN, PENNSYLVANIA.

MILK-DISPENSING VESSEL.

960,492.      Specification of Letters Patent.      Patented June 7, 1910.

Application filed February 6, 1909. Serial No. 476,447.

*To all whom it may concern:*

Be it known that I, ELI H. G. BRINSER, a citizen of the United States, residing at Elizabethtown, in the county of Lancaster and State of Pennsylvania, have invented new and useful Improvements in Milk-Dispensing Vessels, of which the following is a specification.

This invention is an improved jar or vessel especially adapted for use in dispensing milk to customers, one object of the invention being to effect such improvements in the construction thereof as will enable the cream to be readily separated from the milk, a further object of the invention being to provide the vessel with a novel form of spout, a removable partition strip to separate the spout from the vessel and a cover disk to close the upper ends of the vessel and spout and lie on the upper end of the removable partition strip as hereinafter described and claimed.

In the accompanying drawings:—Figure 1 is partly an elevation and partly a vertical sectional view of a vessel constructed in accordance with my invention. Fig. 2 is a sectional view of the same on a plane at right angles to that of Fig. 1. Fig. 3 is a horizontal sectional view of the same. Fig. 4 is a plan of the same with a cover disk removed. Fig. 5 is a detail perspective view of the removable partition strip. Fig. 6 is a plan on a reduced scale of the cover disk. Fig. 7 is a detail perspective view of that portion of the vessel which is provided with the label holder.

In accordance with my invention, the body 1 of the vessel may be of any suitable form. It is here shown as substantially cylindrical, tapering slightly toward its lower end. The bottom 2 of the vessel is shown as concavo convex in cross section with the convex side uppermost. On one side of the vessel and formed integrally therewith is a spout 3 which presents a pair of outwardly converging walls 4, the spout being substantially triangular in cross section as indicated in Figs. 3 and 4. At the upper end of the spout is a pouring notch 3ª. This spout is open on its inner side next the body of the vessel and communicates with the body of the vessel from the bottom to the top thereof. In the side walls of the spout at the points where they join the body of the vessel and on the inner sides thereof are vertical grooves 5 at the inner sides of which are flanges 6.

A removable vertically disposed partition strip 7, which is preferably made of sheet aluminum but which may be made of any other suitable material is disposed with its side edges engaged with the grooves 5 and bearing between the flanges 6 and the bases of the outwardly converging side walls 4 of the spout. The length of the said partition strip is nearly coextensive with that of the spout and when the partition strip is in place to divide the body of the vessel from the spout as shown in the drawings, the lower end of the partition strip is at the bottom of the vessel and its upper end is at a slight distance below the upper edge of the vessel and on a level with an annular circumferential shoulder 8 with which the vessel is formed on its inner side, the said shoulder being slightly lower than the bottom of the pouring notch. The extreme upper end of the said partition strip is inturned as at 9. This partition strip, as will be readily understood, serves to divide the body of the liquid in the body of the vessel from the liquid contents of the spout excepting at the extreme bottom of the vessel where the lower end of the partition strip is cut away as at 10 to form openings which establish communication between the bottom of the vessel and the bottom of the spout.

On one side of the vessel I show a label holding boss or offset 11 and a label strip 12 to bear the initials or name of the owner of the vessel. Said label holding boss and said label strip are specifically described and claimed in another application for patent filed by me and constitute no part of my present invention.

The vessel is preferably provided with scale markings *a* to indicate units of measurement.

In connection with the vessel and the removable partition strip, I provide a cover disk 13 which may be made of paste-board or any other suitable material, is circular in form and of such diameter as to enable it to fit in the upper end of the vessel and bear on the annular shoulder 8, and the said cover disk is provided on one side with an extension 14 of a size and shape to enable it to fit in and cover the upper end of the spout.

The said cover disk also bears on the inturned upper end 9 of the partition strip 7 as shown.

My improved vessel with its removable partition strip between the body of the vessel and the spout enables the milk to be poured from the vessel through the openings 10 at the bottom of the partition strip and separated from the cream as will be readily understood. By removing the cover strip the entire inner surfaces of the vessel and spout are exposed so that the vessel and spout may be very readily and thoroughly cleansed.

While my improved vessel is particularly adapted for use in dispensing milk, it is obvious that the same may be used for other purposes also and I do not desire to limit myself in this particular.

What is claimed is:—

The herein described milk dispensing vessel comprising a cylindrical body, a transversely V-shaped spout on one side of the body joined thereto, communicating therewith from top to bottom and having vertical grooves in its opposing sides at the point of juncture with the body of the vessel, and a bottom common to the body of the vessel and to the said spout, the vessel being further provided with an interiorly disposed annular shoulder near its upper end, a detachable partition strip inserted in the grooves of the sides of the spout to divide the liquid in the body of the vessel from that in the spout, the length of said strip being such that when said strip is in place its upper end is level with the said shoulder in the vessel, and a cover disk to lie on said shoulder and on the upper end of the partition strip and having an extension on one side to fit in and close the spout.

In testimony whereof I affix my signature in presence of two witnesses.

ELI H. G. BRINSER.

Witnesses:
 H. K. OBER,
 CORA B. OBER.